DATA CODER AND INPUT DEVICE

Filed June 5, 1967 3 Sheets-Sheet 1

INVENTOR
PATRICK F. CONNERS

BY *Rines and Rines*

ATTORNEYS

DATA CODER AND INPUT DEVICE

Filed June 5, 1967

3 Sheets-Sheet 2

INVENTOR
PATRICK F. CONNERS

BY Rines and Rines

ATTORNEYS

DATA CODER AND INPUT DEVICE

Filed June 5, 1967 3 Sheets-Sheet 3

INVENTOR
PATRICK F. CONNERS
BY Rines and Rines
ATTORNEYS

United States Patent Office
3,379,834
Patented Apr. 23, 1968

3,379,834
DATA CODER AND INPUT DEVICE
Patrick F. Conners, Huntington Beach, Calif., assignor to Bolt Beranek and Newman Inc., Cambridge, Mass.
Filed June 5, 1967, Ser. No. 643,421
10 Claims. (Cl. 178—18)

ABSTRACT OF THE DISCLOSURE

A device for converting the X–Y coordinates of a cursor into electrical signals. Movement of the cursor is transmitted by cables to transducers having brush carriers which move over code cards at half the rate of the corresponding cursor movement.

This invention relates to data translating devices and more particularly to apparatus for encoding the position of a cursor. Copending applications of Ernest E. Gilbert, Ser. No. 538,843, filed Mar. 30, 1966, and Ser. No. 590,-430, now Patent No. 3,347,986, filed Oct. 28, 1966, both entitled "Data Coder and Input Device" and assigned to the same assignee as the present application, are concerned with apparatus for encoding the position of a cursor with respect to orthogonal coordinates of a table over which the cursor moves. The cursor is mounted upon a track, moving with the track along one coordinate and relative to the track along the other coordinate. Movement of the track is encoded directly by a brush carrier fixed to one end of the track and movable along a code card fixed at one side of the table. Movement of the cursor relative to the track is encoded remotely by a brush carrier coupled to the cursor by cables and movable along another code card. In both encoding operations the ratio of the movement of the brush carrier with respect to the part to which it responds is 1 to 1, thus requiring long code cards to accommodate substantial cursor movement. Moreover, the cable arrangement utilizes pulleys mounted on the cursor, which dictates an offset cursor window.

It is an object of the present invention to provide improved apparatus of the foregoing type, in which both encoders are remote from the cursor and are coupled to the cursor or the cursor track by cables.

Another object of the invention is to provide such apparatus in which the ratio of the movement of the encoding means relative to the cursor or its track is less than 1 to 1, so that a large range of cursor movement along two coordinates may be accommodated with code cards of practical size.

Still another object of the invention is to provide apparatus of the foregoing type in which the construction of the cursor is simplified.

Yet another object of the invention is to provide such apparatus in which the movement of the cursor track is counterbalanced to permit operation of the apparatus which inclined.

The foregoing and other objects, advantages, and features of the invention will become more readily aparent upon consideration of the following detailed description of the invention taken in conjunction with the accompanying drawings, which illustrate a preferred and exemplary embodiment, and wherein.

Figure 1:
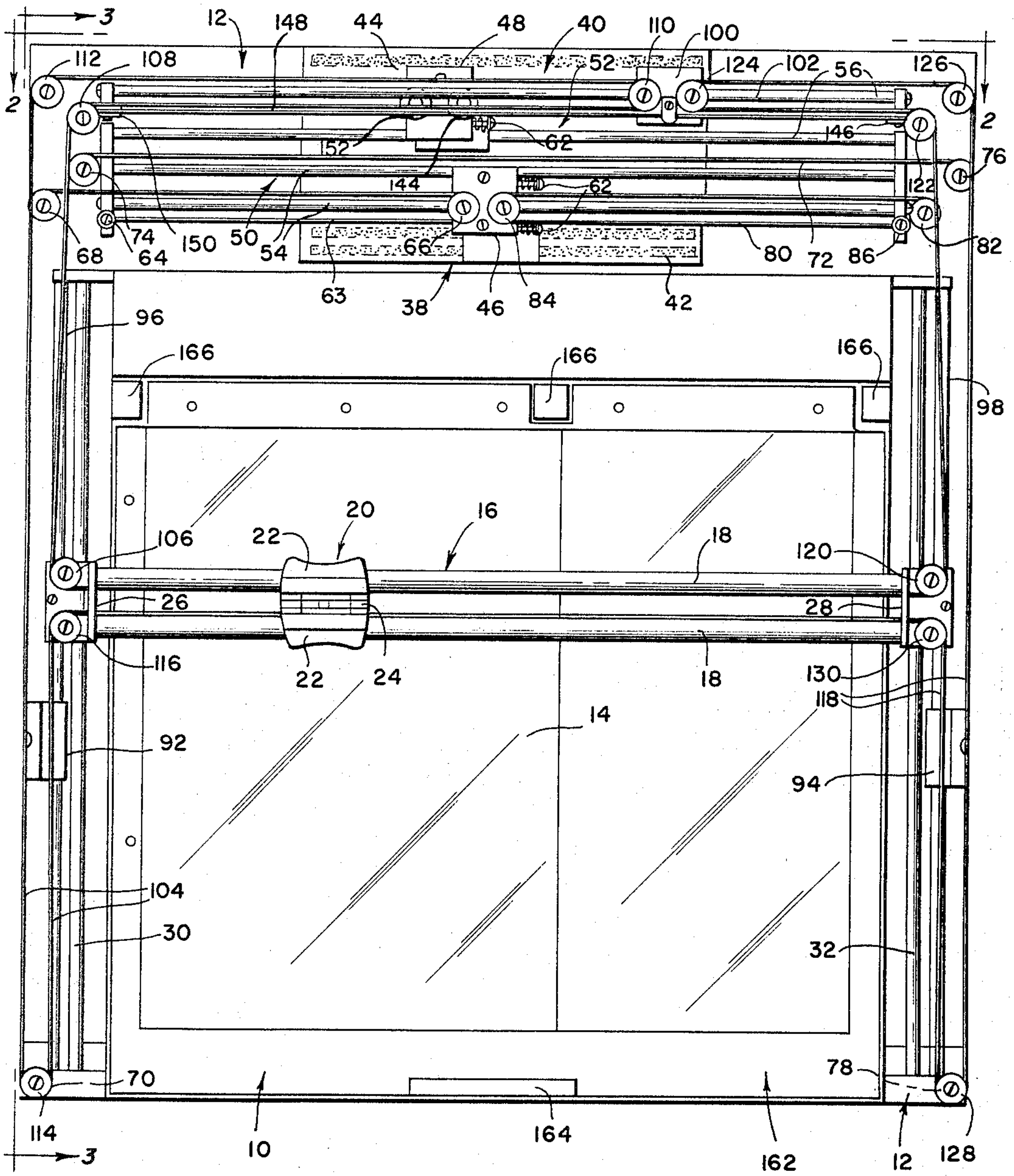
FIGURE 1 is a top plan view of data coder apparatus in accordance with the invention.

Referring to FIGURE 1 of the drawings, the apparatus of the invention comprises a table 10 supported upon a frame 12. At least a portion 14 of the table is preferably translucent so that images may be projected upon the table from below or paper charts or other data-bearing sheets placed upon the table may be illuminated from below. Conventional registration pins may be provided for cooperation with holes in the margins of the data sheets so that the sheets may be precisely positioned relative to the table.

A track or carriage 16 comprising parallel travelling rails 18 is supported for movement over the table and supports a cursor 20 movable along the track. As will be seen hereinafter, the rails move perpendicular to their length along one coordinate (e.g., length) of the table and the cursor moves upon the rails along an orthogonal coordinate (e.g., width) of the table. The cursor has side pieces 22 with bores through which the rails 18 pass, the side pieces being contoured to facilitate engagement with the fingers of the user. A transparent window 24 joins the side pieces and is provided with appropriate index lines.

Figure 3:
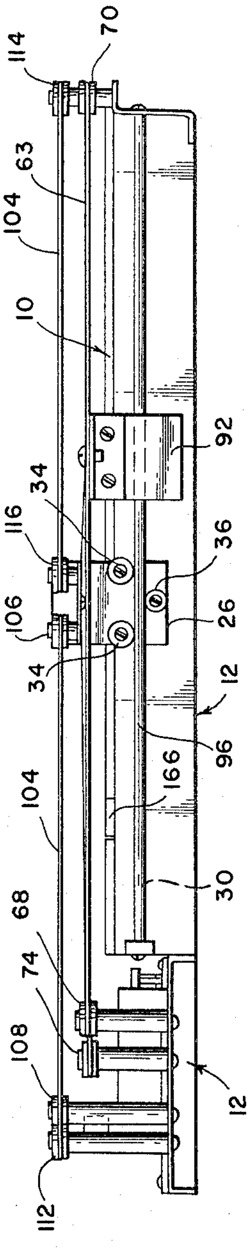
FIGURE 3 is a side elevation view as seen in the direction of the arrows 3—3 of FIGURE 1.

As shown in FIGURES 1 and 3, opposite ends of the rails 18 are mounted upon trucks 26 and 28, respectively, which ride upon parallel cylindrical side rails 30 and 32 fixed to the frame 12 of the apparatus at the sides of the table 10. Each truck has a pair of rollers 34, which ride on top of rail 30 or 32, and each has a roller 36 mounted beneath the rail and located approximately midway between the rollers 34. Rollers 34 may be cylindrical bogey wheels and roller 36 a V-groove roller or vice versa.

In accordance with the invention, the position of the cursor relative to the table along orthogonal coordinates is translated or converted to electrical signals by a pair of transducers or encoding devices 38 and 40. Each encoding device comprises a digital code card 42 or 44 mounted upon the frame 12 at one end of the table 10 at a level slightly below the table. The code cards are positioned side by side facing upwardly and are of the well known type comprising conductive areas arranged on a non-conductive base (as by printed circuit techniques), the arrangement being chosen to represent a suitable digital code, such as a reflected binary code. The conductive areas define a series of parallel bit lines, as is well known in the art.

Figure 2:
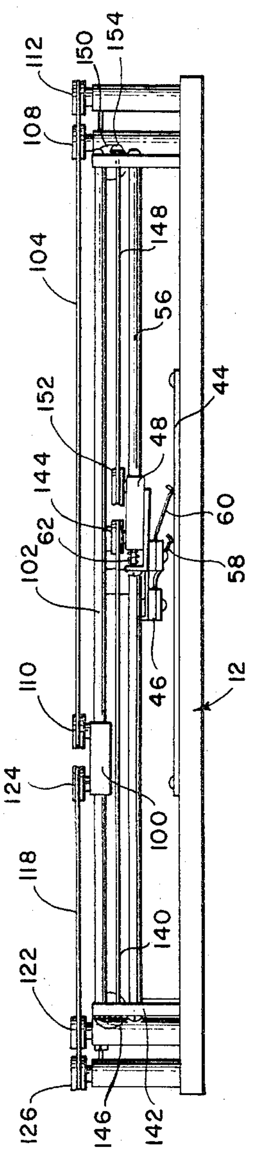
FIGURE 2 is an end elevation view as seen in the direction of the arrows 2—2 of FIGURE 1.

Each encoding device also comprises a slider or brush carrier block 46 or 48 supported upon a corresponding track 50 or 52. Track 50 comprises parallel rails 54, while track 52 comprises parallel rails 56 (one of which is obscured in FIGURE 1 but is shown in FIGURE 2). Tracks 50 and 52 extend parallel to track 16 and the track rails pass through corresponding bores in the sliders 46 and 48. Each slider carries a series of brushes 58 or 60 (see FIGURE 2) arranged to contact corresponding conductive areas of the code pattern represented by the different digits of the code. The brushes of each series may be connected together so as to provide electrical energy to selected conductive code areas of the pattern from a brush which continuously engages a common conductive area of the pattern. Thus the position of the sliders 46 and 48 will determine which conductive code lines will receive electric energy. The position of each set of brushes relative to the supporting block of its slider may be adjusted by means of screws 62 for precise calibration of the apparatus.

Figure 5:
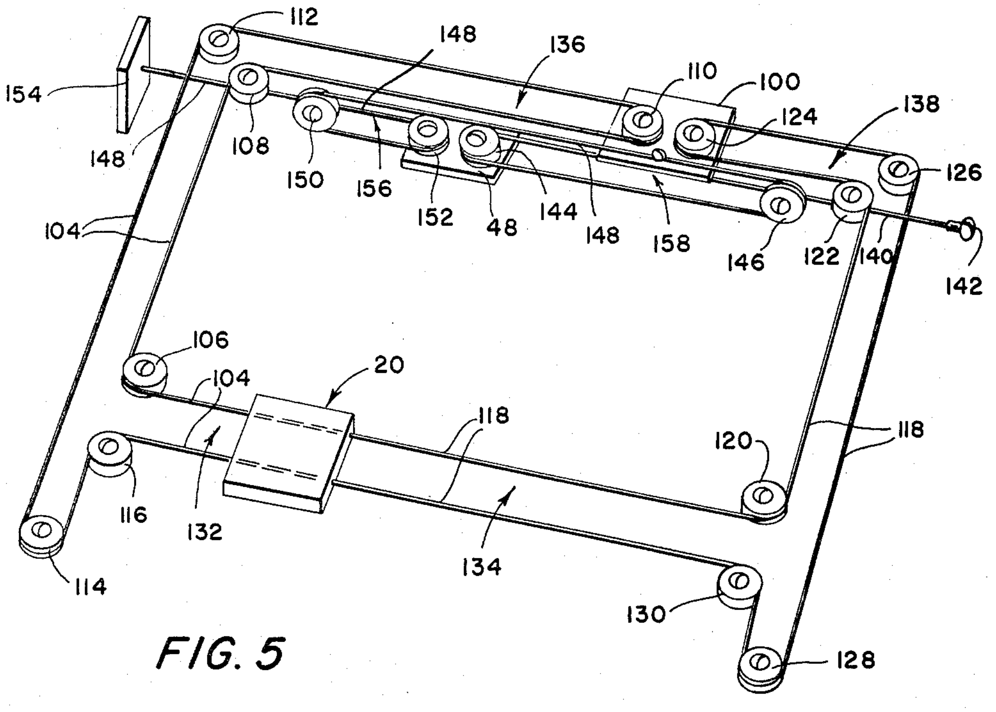
FIGURE 5 is a perspective diagram of a cable arrangement for transmitting the position of the cursor along one coordinate.
Figure 6:
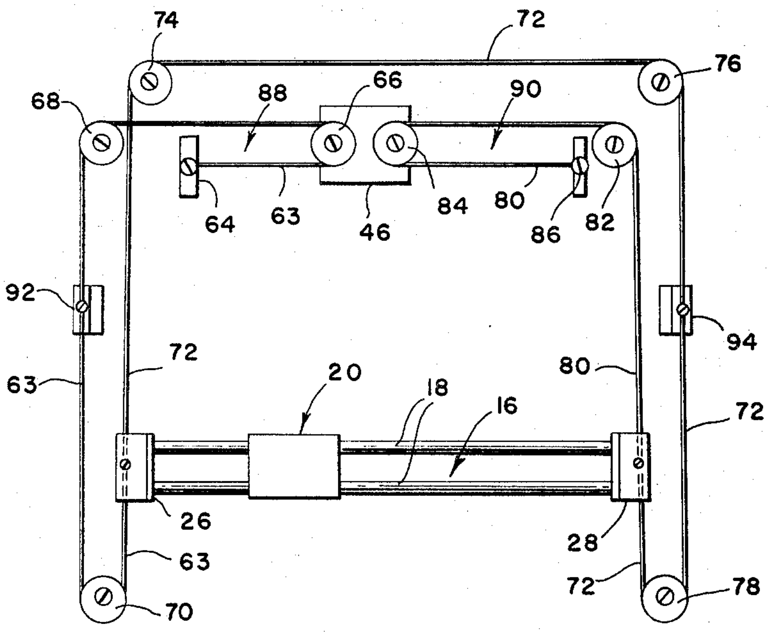
FIGURE 6 is a plan diagram of a cable arrangement for transmitting the movement of the cursor along another coordinate.

In accordance with the invention, the position of the cursor 20 with respect to the coordinates of the table is transmitted to the sliders 46 and 48 by means of cables. Because in certain views some of the cables are obscured by others, schematic diagrams of the cable circuits are shown in FIGURES 5 and 6. FIGURE 6 illustrates the arrangement for transmitting to the slider 46 the movement of the cursor (and its track) along the length of the table. The cable arrangement includes three cable sections. A first section, 63, has one end fixed to the table at 64, then extends transversely of the table and around a pulley 66 supported upon slider 46 and in the opposite direction to a pulley 68 mounted near the left-rear corner of the table. The cable then extends along the left side of the table to a pulley 70 at the left-front corner of the table and then reversely to truck 26, where the cable section is fixed. The next section, 72, has one end fixed to truck 26 (actually being continuous with cable section 63), extends along the left side of the table to a pulley 74 at the left-rear corner, then transversely of the table to a pulley 76 at the right-rear corner, then along the right side of the table to a pulley 78 at the right-front corner, and then reversely to truck 28, where the section is fixed. The next section, 80, has one end fixed to truck 28 (actually continuous with section 72) and extends along the right side of the table to a pulley 82 mounted adjacent to the right-rear corner of the table and then transversely of the table to a pulley 84 supported upon slider 46 and reversely about this pulley to its other end, which is fixed at 86 relative to the table. Lateral cable pockets 88 and 90 coupled to slider 46 and extending oppositely therefrom are defined by the cable arrangement. Counterweights 92 and 94 are fixed to the cable sections 63 and 72 at opposite sides of the table and slide upon side rails 96 and 98 (see FIGURE 1) which pass through bores in the counterweights.

It is apparent from the cable diagram of FIGURE 6 that movement of the track 16 toward either end of the table will cause corresponding movement of the slider 46, one pocket, 88 or 90, expanding in length while the other contracts. Thus, if track 16 is moved toward the rear of the table, pocket 88 will contract and pocket 90 will expand as the slider 46 moves to the left. Reverse movement of track 16 will cause corresponding reverse movement of slider 46. The counterweights 92 and 94 move opposite to the direction of movement of the track 16 and counterbalance the weight of the track, so that the apparatus may be used while inclined, without unintended movement of the track. Because of the formation of the pockets 88 and 90, slider 46 will move at half the rate and cover half the distance of the track 16. Hence, a relatively short code card will accommodate a wide range of movement of the track 16, avoiding the expense and impracticality of long code cards.

The cable arrangement for converting the movement of the cursor 20 along the track 16 and the width of the table is illustrated in FIGURE 5. Employed in this arrangement is an additional slider, 100, supported upon a rail 102 parallel to the rails of track 16 as shown in FIGURES 1 and 2.

Referring to FIGURE 5, the cable arrangement comprises a cable section 104 having one end fixed to cursor 20, extending transversely of the table and around a pulley 106 supported upon truck 26 (see FIGURE 1), along the left side of the table, around a pulley 108 supported at the left-rear corner of the table, then transversely of the table and reversely around a pulley 110 supported upon slider 100, back across the table and around a pulley 112 supported upon the left-rear corner of the frame, then along the left side of the table and reversely around a pulley 114 mounted upon the left-front corner of the frame, along the left side of the table and around a pulley 116 supported upon truck 26 (see FIGURE 1) and transversely of the table to its other end, fixed to cursor 20.

Another cable section, 118 (which may actually be continuous with cable section 104), has one end fixed to cursor 20, extends transversely of the table and around a pulley 120 mounted upon truck 28 (see FIGURE 1), along the right side of the table and around a pulley 122 supported upon the right-rear corner of the frame, then transversely of the table and around a pulley 124 supported upon slider 100, reversely to a pulley 126 mounted upon the right-rear corner of the frame, along the right side of the table, reversely around a pulley 128 supported upon the right-front corner of the frame and around a pulley 130 mounted upon the truck 28, and transversely of the table to the cursor 20, where the other end of section 118 is fixed.

It is apparent that this cable arrangement provides a pair of lateral cable pockets 132 and 134 extending at opposite sides of cursor 20 and a pair of lateral pockets 136 and 138 extending at opposite sides of slider 100. Pockets 132 and 134 expand and contract in opposition as the cursor 20 is moved transversely of the table, while pockets 136 and 138 expand and contract in opposition as the slider 100 moves transversely of the table. Expansion of pocket 132 is accompanied by contraction of pocket 136, and vice versa, while contraction of pocket 134 is accompanied by expansion of pocket 138, and vice versa. Slider 100 moves at the same rate and covers the same distance as cursor 20, although in the opposite direction. It is desired that slider 48 of the encoding apparatus move at half the rate of cursor 20, and this is accomplished by the interconnection of slider 48 and slider 100 as will now be described.

A cable section 140 has one end fixed at 142 to the right-rear corner of the frame and extends transversely of the frame and reversely around a pulley 144 mounted upon slider 48, then transversely of the table and reversely around a pulley 146 supported on the frame in a plane perpendicular to the table, and around this pulley to slider 100, where the other end of this cable section is fixed. Another cable section, 148, has one end fixed to slider 100 (actually continuous with section 142), extends transversely of the table to pulley 150 mounted upon the frame in a plane perpendicular to the table, reversely around this pulley to a pulley 152 mounted upon slider 48, and reversely to its other end, which is fixed at 154 to the left-rear corner of the frame. Opposing lateral cable pockets 156 and 158 are thus defined, pocket 156 expanding as pockets 158 contracts, and vice versa. By this arrangement, slider 48 moves at half the rate of slider 100 and in the opposite direction, and thus at half the rate of the cursor 20 and in the same direction.

Slider 48 does not respond to movement of the track 16 along the length of the table. Cable pockets 132 and 134 are merely shifted along the table by feeding of the cables around the pulleys, and there is no expansion or contraction of these pockets or the associated pockets 136 and 138. Obviously, slider 46 does not respond to movement of cursor 20 along the track 16, because there is no motion of the track relative to the table. The relationship of the pulleys of the two cable systems of FIGURES 5 and 6 can be seen in FIGURES 1–3. The pulleys of the two systems adjacent to the corners of the table are at different heights, so that the cables do not interfere.

Figure 4:
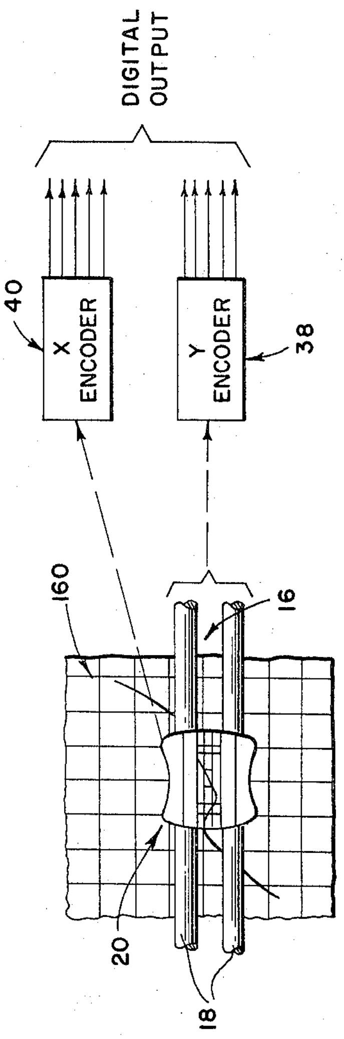
FIGURE 4 is a schematic diagram illustrating the use of the invention.

In the use of the apparatus of the invention (see FIGURE 4), a suitable data display, such as a graph or chart 160 is placed or projected upon the table in a predetermined position. Data may be encoded by positioning the index lines of the cursor 20 over the data, such as points on a curve, the brush carriers of the encoders 38 and 40 assuming corresponding positions. If a switch (not shown) is then closed to energize the code cards, outputs will be produced from the selected conductive areas of the cards and will define a digital code which may be read out from the cards serially or in parallel as is well known in the art. Other data may be similarly encoded.

If desired, the table may have a transparent protective cover 162 (FIGURE 1) for the data display, and the cover may have a handle 164 for causing the cover to pivot about the axis of hinges 166 after the track 16 has been moved rearwardly beyond the hinges.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative rather than restrictive of the invention, and those modifications which come within the meaning and range of equivalents of the claims are to be included therein.

The invention claimed is:

1. Data translating apparatus comprising a table, a carriage supported for movement along a predetermined coordinate of the table, transducer means spaced from said carriage for translating the position of said carriage along said coordinate into electrical signals, said transducer means having a part fixed with respect to said table and a cooperating movable part supported for reciprocation with respect to said fixed part, and means coupling said carriage to said movable part of said transducer means for responsive movement, said coupling means comprising cable means having a cable portion extending along said coordinate of the table and fixed to said carriage and having a cable portion defining cable pocket coupled to said movable part, and means for causing said pocket to expand and contract in response to movement of said carriage.

2. The apparatus of claim 1, said cable means having portions extending along said coordinate at opposite sides of said table and fixed to corresponding ends of said carriage, having portions defining a pair of said pockets coupled to said movable part from opposite sides thereof, and having means for causing said pockets to expand and contract oppositely.

3. The apparatus of claim 2, said transducer means being located adjacent to an end of said table, said cable means being fixed with respect to said table at points adjacent to opposite sides thereof, then extending from said points toward said movable part along one side of each pocket, then reversely about means on said movable part and along the other side of said pockets to said sides of the table, then along the sides of said table to the opposite end of the table, then reversely along said sides of the table to the first-mentioned end and across that end.

4. The apparatus of claim 3, said cable means having counterweights fixed thereto where said cable means extends along the sides of said table to said opposite end of the table and said cable means being fixed to said carriage where said cable means extends reversely along said sides of said table.

5. Data encoding apparatus comprising cursor means supported for reciprocative movement along a predetermined coodinate of an information display, code producing means separated from said cursor means and having a fixed part and a movable part arranged to reciprocate with respect to said fixed part, and means coupling said movable part to said cursor means for responsive movement, said coupling means comprising a continuous cable having its opposite ends fixed to said cursor means and having portions defining a pair of cable pockets, one of said pockets being coupled to said cursor means and the other of said pockets being coupled to said movable part, and means for causing said one pocket to expand when said cursor means is moved in a predetermined direction and causing said other pocket to contract and move said movable part in a predetermined direction.

6. Data encoding apparatus comprising cursor means supported for reciprocative movement along a predetermined coordinate of an information display, code producing means separated from said cursor means and having a fixed part and a movable part arranged to reciprocate with respect to said fixed part, and means coupling said movable part to said cursor means for responsive movement, said coupling means comprising cable means defining a pair of cable pockets, one of said pockets being coupled to said cursor means and the other of said pockets being coupled to said movable part, means for causing said one pocket to expand when said cursor means is moved in a predetermined direction and causing said other pocket to contract and move said movable part in a predetermined direction, said code producing means comprising a second moving part coupled to the first-mentioned moving part by second cable means having a portion fixed to the first-mentioned moving part and a portion defining a cable pocket coupled to the second moving part for moving the second moving part at a rate substantially less than that of the first-mentioned moving part.

7. Data encoding apparatus comprising a table, a carriage track supported for movement over said table along a first coordinate of the table, a cursor supported for movement over said track along a second coordinate of the table, first code producing means for encoding the position of said cursor with respect to said table in terms of said first coordinate, second code producing means for encoding the position of said cursor with respect to said table in terms of said second coordinate, both said code producing means being separated from said track and located adjacent to an end of said table and each having a part fixed with respect to said table and a cooperating part movable with respect to said table, said movable parts being supported for reciprocation upon tracks parallel to said carriage track, the movable part of the first code producing means being coupled to said cursor by cable means for reciprocative movement along its fixed part in response to the movement of said cursor along said carriage track, the movable part of the second code producing means being coupled to said carriage track by cable means for reciprocative movement along its fixed part in response to the movement of said carriage track along said table.

8. The apparatus of claim 7, said cable means comprising means for moving the associated movable parts at a rate substantially less than that of said cursor and said carriage track, respectively.

9. The apparatus of claim 7, the cable means coupling said cursor and the movable part of said first code producing means comprising a first cable section having portions extending along a side of said table and portions defining a pair of lateral pockets coupled to said cursor and the movable part of said first code producing means, respectively, and means for causing said pockets to expand and contract oppositely, and a second cable section having portions extending along the opposite side of said table and portions defining a second pair of said pockets coupled to said cursor and said movable part of said first core producing means opposite to the first-mentioned pair of pockets, the pockets associated with said cursor being formed by means supported on said carriage track and being movable with that track without affecting the size of the remaining pockets, each cable section having its ends fixed to said cursor.

10. The apparatus of claim 7, said cable means coupling said carriage track and the moving part of said second code producing means comprising a first cable section with one end fixed to an end of said carriage track and the opposite end fixed to said table adjacent to the second code producing means, having portions extending along a side of said table and portions defining a lateral pocket coupled to the movable part of said second code producing means, a second cable section having one end fixed to said one end of the carriage track and extending therefrom along said one side, then transversely of the table, then along the other side, and reversely along said other side and having its opposite end fixed to the other end of said carriage track, and a third cable section having one end fixed to said other end of the carriage track and its opposite end fixed to said table at the opposite side of said second code producing means and having portions extending along said other side of said table and portions defining a lateral pocket coupled to said movable part of said second code producing means opposite to the first-mentioned pocket.

No references cited.

THOMAS A. ROBINSON, *Primary Examiner.*